US007831466B1

(12) United States Patent
Wallach et al.

(10) Patent No.: US 7,831,466 B1
(45) Date of Patent: Nov. 9, 2010

(54) INSURANCE INCENTIVE PROGRAM FOR PROMOTING THE PURCHASE OR RELEASE OF AN AUTOMOBILE AFTER AN EXPIRATION OF A LEASE

(75) Inventors: Robert Wallach, Mill Neck, NY (US); Jasper Jackson, Montclair, NJ (US)

(73) Assignee: Disruptive Technologies Ltd., Locust Valley, NY (US)

( * ) Notice: Subject to any disclaimer, the term of this patent is extended or adjusted under 35 U.S.C. 154(b) by 432 days.

(21) Appl. No.: 09/645,795

(22) Filed: Aug. 24, 2000

(51) Int. Cl.
*G07G 1/00* (2006.01)
(52) U.S. Cl. .............................. 705/14; 705/4; 705/37; 705/36 R; 705/38; 705/26
(58) Field of Classification Search ............... 705/4, 705/14, 35, 36, 36 R, 37, 38–39; 235/400, 235/384, 379, 380
See application file for complete search history.

(56) References Cited

U.S. PATENT DOCUMENTS

| | | | |
|---|---|---|---|
| 4,831,526 A | 5/1989 | Luchs et al. | |
| 5,673,402 A | 9/1997 | Ryan et al. | |
| 5,797,134 A * | 8/1998 | McMillan et al. | 705/400 |
| 5,878,404 A | 3/1999 | Stout et al. | |
| 5,950,169 A * | 9/1999 | Borghesi et al. | 705/4 |
| 5,966,693 A | 10/1999 | Burgess | |
| 5,983,206 A | 11/1999 | Oppenheimer | |
| 6,182,048 B1 | 1/2001 | Osborn et al. | |
| 6,233,563 B1 * | 5/2001 | Jefferson et al. | 705/4 |
| 6,304,859 B1 * | 10/2001 | Ryan et al. | 705/38 |
| 6,347,302 B1 * | 2/2002 | Joao | 705/36 R |
| 6,363,360 B1 | 3/2002 | Madden | |
| 6,449,597 B1 | 9/2002 | McGill | |
| 6,574,606 B1 * | 6/2003 | Bell et al. | 705/14 |
| 7,343,306 B1 | 3/2008 | Bates et al. | |
| 2001/0034690 A1 * | 10/2001 | Joseph | 705/37 |
| 2002/0082860 A1 * | 6/2002 | Johnson | 705/1 |
| 2002/0091550 A1 * | 7/2002 | White et al. | 705/4 |
| 2002/0116228 A1 * | 8/2002 | Bauer et al. | 705/4 |
| 2005/0203780 A1 | 9/2005 | Lott | |

OTHER PUBLICATIONS

Insurance Auto Auctions Expects First -Quarter Earnings To Beat Analyst Expectations; PR Newswire; New York; Apr. 7, 1999; pp. 1-2.*

Consumer group assails car insurance rates in N. Y.; The Record; Bergen County, N.J.; May 8, 1998; by Marc Humbert, The Associated Press; pp. 1-2.*

Samurai Insurance; The Washington Post (pre-1997 Fulltext); Washington, D.C.; Jul. 16, 1988; pp. 1-2.*

(Continued)

*Primary Examiner*—Vanel Frenel
(74) *Attorney, Agent, or Firm*—Chadbourne & Parke LLP; Walter G. Hanchuk

(57) ABSTRACT

A lessee of an item, such as an automobile, is encouraged to either purchase the automobile at the expiration of the lease, or to initiate a new lease for the same item. If the lessee undertakes a purchase or a new lease, a manufacturer of the item, or another party, provides insurance covering the item. The methods disclosed herein may be performed over a computer network, such as the Internet.

78 Claims, 3 Drawing Sheets

OTHER PUBLICATIONS

"Geico Faces Challenges After Grabbing Market Share", J. Cahill, The Wall Street Journal, Jan. 27, 2000.
"Equifax Corp. Posts An Increase of 39% In Quarterly Profit", The Wall Street Journal, Jan. 26, 2000.
"We've put on a lot, without piling on the pounds", advertising for 306 Peugeot Source, date unknown.
"Cars Direct Learns Rules of the Road", Automotive News, Nov. 22, 1999.
"IIAA Strongly Objecting to Direct Sales Program the Hartford Has Entered With Ford Motor Company" Source, date unknown.
"Schrempp defends D/C's mild gain for $2^{nd}$ quarter" Source, date unknown.
"If you 're looking for a reason to buy an Alfa 145, Here's 4", Automobile Advertisement; Source, date unknown.
"Chrysler: Record $1^{st}$ Quarter pro-fit", R. Kisiel and J. Henry, Automotive News Apr. 13, 1998.
"£84.99 a month, three year's free servicing and one year's free insurance. Remember to wipe the ink off your face when you kiss the page", Hyandai Advertisment; Source, date unknown.
"The 1999 Ford Feature Models" advertising from Ford, date unknown.
"We've summed up the Citroën Saxo in two words" advertising from "Citroën Saxo", Citroen Saxo Advertisement.
"Get the Figure You've Always Dreamed of", Renault advertisement; source, date unknown.
"Pearly Queens in London?" advertising from Rover; source, date unknown.
"Ford Must Rebuild Europe Market Share" The Wall Street Journal Jan. 26, 2000.
"Toyota flexes finance arm", James B. Treece, Automotive News, Nov. 30, 1998.
"Performance Insurance Direct", advertisement; Source, date unknown.
"Porsche Motor Insurance" Porsche Club Approved, advertisement Source, date unknown.
"BMW Financial-Chubb: The ultimate marketing machine", finance & Insurance Oct. 25, 1999.
"Daimler Chrysler Struggles to Fix Image After Stock Slides on Earning Report", The Wall Street Journal Aug. 2, 1997.
"D/C uses rebates to hold line in van market" Automotive News, Ralph Kisiel, Dec. 6, 1999.
"Ford Coupons offer F-series discounts" Automotive News, Mary Connelly, Nov. 22, 1999.
"The real cost of new cars: more than you think", Autoweek, Aug. 16, 1999.
"Car payments haven't grown but they do live longer" Source, date unknown.
"Ford Credit eyes 10% earnings gain", Finance and Insurance; date unknown.
"Key Reasons to Protect Your Automobiles With Chubb" Source, date unknown.
"D/C Ads Wave Five Star Dealer Flag", Automotive News, Sep. 20, 1999, Dave Gailford.
"BMW Program Puts New Soul in Body Shops", Automotive News, Arleva Sawyers Sep. 7, 1998.
"Study: Certified used cars worth more", Arlena Sawyers, Automotive News, Dec. 6, 1999.
"Poll: Future bright for used autos" Frank S. Washington, Automotive News Feb. 8, 1998.
"GM modifies certified used vehicle plan" Arlena Sawyers, Automotive News, Dec. 6, 1999.
"D/C Minivans get big changes under the skin" Michael Woodyard and Ralph Kisiel, Jan. 2000.
"Comeback Kids: Minivans post big sales gains in first quarter" John K. Teahen Jr., Automotive News, Apr. 19, 1999.
"D/C tries to rescue smart project", Automotive News, Dorothee Ostle Apr. 26, 1999.
"CITRONEN", Advertisement, Evening Standard London Jul. 2, 1999.
"Network Q Quality Used Cars", Advanced Economics, Vauxhall, date unknown.
"Choice 1.2..3 Calculated to Impress", Advanced Economics, advertisement; Source, date unknown.
"Young buyers seek honestly, not glitz", Jean Halliday, Automotive news Nov. 1, 1999.
(Fixed-Rate Mortgage Still Popular by Ruth Richey. Richmond Times-Dispatch. Richmond, Va, Mar. 16, 1986.
Life Cycle of a net-leased property by (Cline, Leonard A. Real Estate Review. New York: 1997, vol. 27, Iss. 3; p. 34, 5 pgs).
Yamaha to get insurance plan OK'D by Jan. 1, Orange County Business Journal, p. 4; Dec. 2, 1990.
Lease, Buy or Reimburse Outside Sales Vehicles By Battersby, Mark E. Agency Sales. Irvine: Oct. 1986, vol. 16, Iss. 10; p. 55, 3 pgs.
Ford plans to test no-hassle car lease; Phil West The Associated Press; The Commercial Appeal; Nemphis Tenn; Sep. 26, 199 pp. 1-2.
Andrews, Julie. Hazard Insurance Protects Your Investment. Gazette Telegraph. Colorado Springs Gazette-Telegraph. Colorado Springs, CO: Jul. 23, 1995. pp. G. 4.
Getting a handle on commercial automobile costs; Risk Management; New York, Mar 1995, Vendetti, James G; vol. 42; pp. 1-4.
Ford to Test One-Stop Lease Program. Los Angeles Times. Sep. 26, 1995. p. 2.
Rechtin, Mark. Yamaha Tells Dealers of Plan to Offer Free Insurance in '91. Orange County Business Journal. Oct. 22, 1990. vol. 13 Issue 22.
Richards, Cindy. AMC Offers Auto Loans at 0 Percent. Chicago Sun-Times. Sep. 4, 1986, p. 67.
More Frequent Payments Cut Car Loan Cost. Toronto Star. Apr. 16, 2000. p. 1.
Buss, Dale. Chrysler Unveils Rebates, Will Lift Maserati Holding. Wall Street Journal. Feb. 18, 1986. p. 1.
Best, Chris. Brokers Driven by Auto Insurance Scheme. Risk Management. Dec. 1990. vol. 37 Issue 12. p. 66.
Tax Practice: Purchase vs. Lease of an Automobile; Levy, Gregory M. Journal of Accountancy, Mar. 1992, vol. 173, Iss. 3; p. 35, 4 pgs.

* cited by examiner

| Lessee Identification 202 | Lessee Contact 203 | Make/Model 204 | Lease Expiration 206 | Confirmation of Purchase/Renewal 208 | Confirmation of Insurance Provided 210 |
|---|---|---|---|---|---|
| Customer A | 123 Main Street, New York, NY 10001 | Chrysler LHS | 1/1/01 | N | N |
| Customer B | 3000 E 23rd Street New York, NY 10036 | Mercedes 240 CLK | 8/22/00 | Y | Y |
| Customer C | (712) 555-1212 | 1998 Chrysler Concorde | 9/22/00 | Y | N |

FIG. 2

INSURANCE INCENTIVE PROGRAM FOR PROMOTING THE PURCHASE OR RELEASE OF AN AUTOMOBILE AFTER AN EXPIRATION OF A LEASE

CROSS-REFERENCE TO RELATED APPLICATIONS

This application is related to co-pending U.S. patent application Ser. No. 09/645,020 entitled "Insurance Incentive Program for Promoting the Purchase or Lease of an Automobile" filed on Aug. 23, 2000, and is further related to U.S. patent application Ser. No. 09/645,794 (U.S. Pat. No. 7,349,860) entitled "Insurance Incentive Program Having a Term of Years for Promoting the Purchase or Lease of an Automobile" filed on Aug. 24, 2000, and is further related to co-pending U.S. patent application Ser. No. 11/776,512, entitled "Insurance Incentive Program Having A Term Of Years For Promoting The Purchase Or Lease Of An Automobile" filed on Jul. 11, 2007, and is further related to co-pending U.S. patent application Ser. No. 11/776,507, entitled "Insurance Incentive Program For Promoting the Purchase or Release of an Automobile After An Expiration of a Lease", filed on Jul. 11, 2007, and is further related to co-pending U.S. patent application Ser. No. 11/776,502, entitled "Insurance Incentive Program for Promoting the Purchase or Lease of an Automobile, the entirety of each being incorporated herein by reference.

FIELD OF THE INVENTION

The present invention is directed generally to sales incentive programs, and more particularly to sales incentive programs in which a lessee of an item, such as an automobile, is offered free or discounted insurance in exchange for purchasing or re-leasing the automobile after the expiration of the lease.

BACKGROUND OF THE INVENTION

It is common for manufacturers or retailers to provide incentives to potential purchasers or lessees in order to increase the sale of an item. In order to encourage leasing of automobiles, in particular, a retailer may typically over-value the projected worth of the car at the end of a lease period, prior to the lease being initiated. This has the effect of lowering the monthly payments that are typically due during the term of the lease. This over-valuing may positively impact sales. However, at the end of the lease period, a leasing agent must absorb the difference being the projected value and the actual value of the automobile, if it is not purchased or re-leased by the lessee. Therefore, it would be advantageous to encourage the purchase or re-lease of an automobile after the expiration of an initial lease in order to avoid these potential losses.

Lessees also must weigh many factors in determining what to do at the end of a lease of an automobile. A lessee must consider the cost of purchasing the automobile at the end of the lease, the cost of obtaining continuing insurance, as well as other variables, such as penalties for damage to the car and excessive mileage in making a determination. It would therefore be advantageous to encourage the purchase or re-lease of an automobile by providing an incentive that would alleviate some of these costs and considerations.

SUMMARY OF THE INVENTION

The present application is directed to particular features of a system and method of providing an incentive to purchase an automobile at the expiration of a lease period by providing insurance wherein the insurance premium is paid as a part of a periodic payment due for the purchase.

In particular, one aspect of the invention includes a method for encouraging the purchase or re-leasing of an item after an expiration of a lease. A financial agent, or the like, identifies a lease on an item, the lease having an approaching expiration date. A customer corresponding to the lease is identified and is offered a paid or discounted insurance policy in exchange for purchasing or re-leasing the item after the expiration of the initial lease.

In a second embodiment of the present invention, a method for encouraging the purchase of an item after an expiration of a lease includes identifying a customer having a lease on an item, the lease having an approaching expiration date. A difference between an actual residual value and a projected residual value of the item is calculated, and a term of insurance is determined such that an offered insurance policy has an insurance premium at most equal to the calculated difference. If the lessee purchases the item at the expiration of the lease, the insurance premium is paid on behalf of the customer for the term of the insurance policy.

According to a third embodiment of the present invention, a method for receiving an insurance policy for an item begins when a lessee leases an item for a predetermined period of time. If the customer purchases or re-leases the item at the expiration of the predetermined period of time, the customer receives an insurance policy for the item, wherein at least a portion of a premium corresponding to the insurance policy is paid by a third party.

BRIEF DESCRIPTION OF THE DRAWINGS

Further aspects of the instant invention will be more readily appreciated upon review of the detailed description of the preferred embodiments included below when taken in conjunction with the accompanying drawings, of which:

FIG. 2 is an exemplary database of leases for identifying a lease having an imminent expiration date.

DETAILED DESCRIPTION OF THE INVENTION

In general, the present invention is directed to various methods, and apparatus for accomplishing the same, by which a lessee of an item, such as an automobile, is encouraged to purchase the automobile prior to, at or after the expiration of the lease, or to continue with a new lease (hereinafter referred to as a re-lease) of the same automobile prior to, at or after the expiration of the original lease. According to certain embodiments of the present invention, the lessee will receive, from an insurance provider, or the like, a no-cost or discounted insurance policy covering the item in exchange for purchasing the item or continuing a new lease on the item.

Typically, insurers offer six categories of coverage, some of which are mandatory by various state governments. These include: (1) bodily injury liability, for injuries the insured causes to another party; (2) personal injury protection (i.e. no-fault coverage), for medical expenses and lost wages relating to the treatment of injuries to the driver and passengers of the insured's automobile; (3) property damage liability, for damage caused by the insured to another's property; (4) collision coverage, for damage to the insured's car resulting from a collision with another car or object; (5) comprehensive coverage, for damage to the insured's car that doesn't involve a collision (i.e., fire, theft, falling objects, and acts of God); and (6) uninsured motorist coverage, for treatment of an insured's injuries as a result of a collision with an uninsured driver. A policy provided to a lessee according to the present invention may contain any or all of the coverages described above.

The insurance provided according to the present invention may be of the type described in co-pending U.S. patent application Ser. No. 09/645,020 entitled "Insurance Incentive Program for Promoting the Purchase or Lease of an Automobile" filed on Aug. 23, 2000, assigned to the assignee of the present invention and incorporated herein by reference.

The insurance provider may be any licensed insurance carrier. However, it is preferred that the insurance carrier be affiliated with one of the financial agent, the retailer or the manufacturer, as described herein, in order to facilitate negotiations for the provision of insurance, and costs related thereto (e.g. premium costs), according to the present invention.

Figure 1:
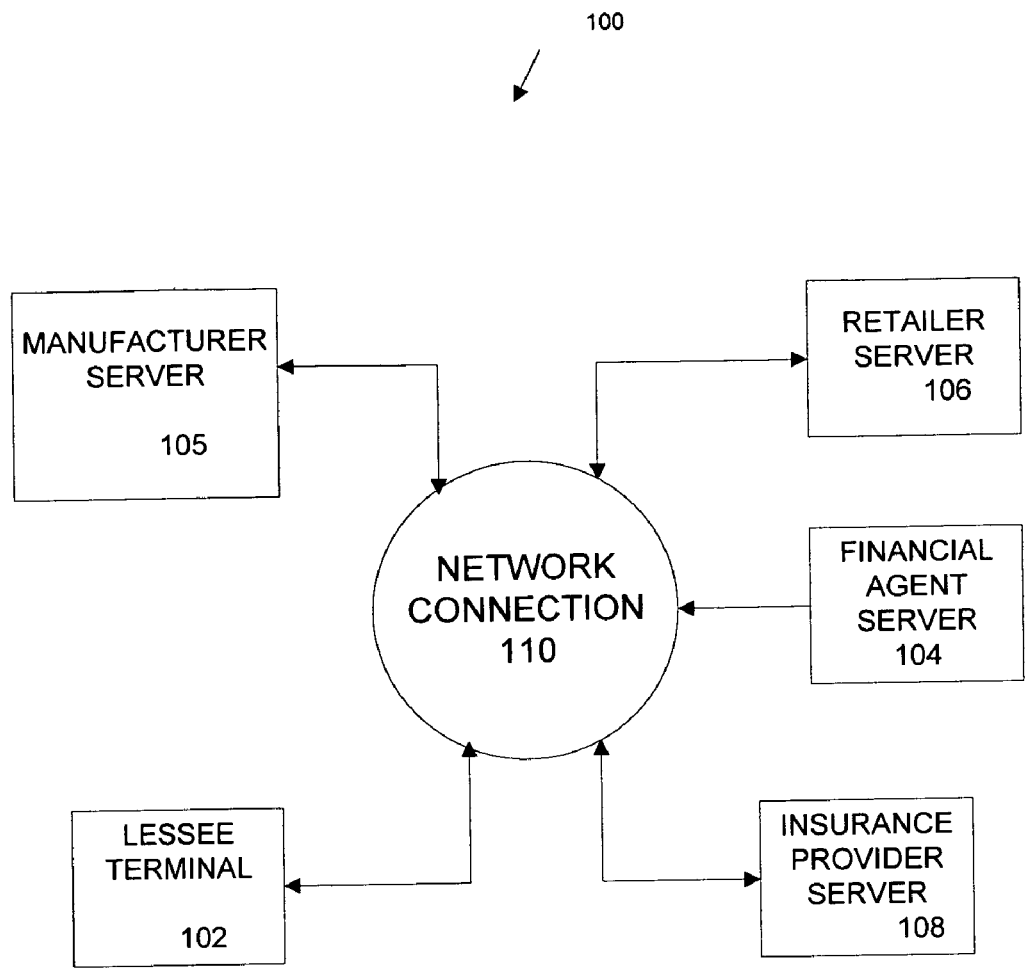
FIG. 1 is a block diagram of an exemplary computer network by which a customer may communicate with one or more parties to receive an insurance incentive to purchase or re-lease an item.
Figure 3:
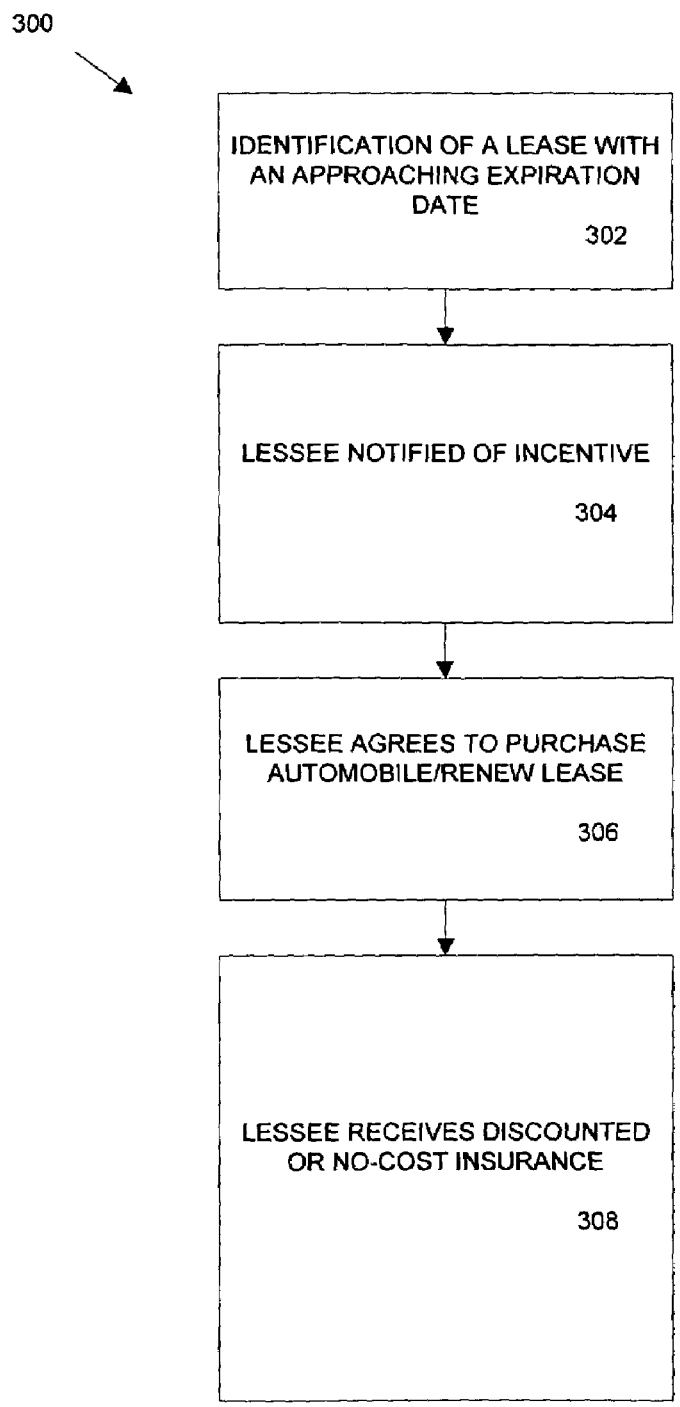
FIG. 3 is an exemplary process by which a customer is offered an insurance policy in exchange for purchasing or re-leasing a leased item at the expiration of the initial lease.

Referring now to FIGS. 1-3, wherein similar components of the present invention are referenced in like manner, preferred embodiments of an insurance incentive program for promoting the purchase or a continuation of a lease of an item, such as an automobile, are disclosed.

FIG. 1 depicts an exemplary computer network 100 for accomplishing the methods of the present invention. It is contemplated that the computer network 100 may be any hard-wired or wireless network, or a combination of the same, for accomplishing communications between a lessee server 102, a financial agent server 104, a retailer server 105, a manufacturer server 106, and an insurance provider server 108 over one or more network connections 110. In certain embodiment it is contemplated that computer network 100 may be, for example, the Internet or World Wide Web, however, the computer network 100 may be any of a local area network, wide area network, an Intranet, an extranet, and/or a wireless communications network. Network connection 110 may be any component used to route communications over a hard-wired or wireless network as is known in the art.

It is additionally contemplated that any transactions between a lessee, financial agent, retailer, manufacturer and insurance provider may be performed offline, without the assistance of a computer network. Such offline communications may be accomplished in-person or via use of the telephone or via written communications.

In an online embodiment, the lessee, via lessee terminal 102 over network connection 110, may communicate with the financial agent server 104 to receive information concerning the provision of insurance in exchange for purchasing or re-leasing an automobile after an expiration of a lease, to accept the offer of provision of insurance or to provide electronic payment relating to the purchase or re-lease. The lessee may further communicate with the manufacturer server 105 or retailer server 106 to receive information about the purchase or release of the automobile, or to initiate the purchase or re-lease of the automobile. The lessee may also communicate with insurance provider terminal 108 to receive information about insurance being provided to the lessee, to communicate claims information or the like.

Each of the servers 104, 105, 106 and 108 may be operative to communicate over the network 100 in any known manner known to coordinate the methods disclosed and are each preferably operative to handle high-bandwidth communications from multiple lessees simultaneously.

The lessee terminal 102 may be any personal communications device operative to communicate over network 100, such as a personal computer with the ability to handle network communications, as well as, personal workstations, network terminals, personal digital assistants (PDAs), cellular telephone equipped with wireless interne access or any other similar hard-wired or wireless communications equipment.

Referring now to FIG. 2, therein is depicted an exemplary lease database 200 for storing information regarding lessees and their corresponding leases. In referring to the databases depicted therein, it is important to note that the first row of the databases includes a field header for each field of the database and the remaining rows each correspond to one record of the database. Fields of data, are represented by each column. Further or fewer fields and records of data may be used. The databases presented herein may be configured into any number of relational databases. In addition, configurations other than database formats may be used to store the data maintained in exemplary lessee database 200.

The lessee database 200 may be stored, maintained and updated by a financial agent, a manufacturer, a retailer or any party interested in an approaching expiration of a lease. The data in lessee database 200 may be used to determine an expiring lease, to provide contact information for notifying a lessee of an incentive to purchase or re-lease according to the present invention, as well as to provide confirmation that the incentive has been provided. Accordingly, the lessee database may contain a lessee identification field 202, a lessee contact information field 203, a make/model of automobile field 204, a lease expiration date field 206, a dealer field 207, a confirmation of purchase/renewal field 208 and a confirmation of insurance provided field 210.

The lessee identification field 202 may contain any indication of an individual lessee, such as the lessee's name. The lessee contact information field 203 may contain contact information for a particular lessee, such as the lessee's home address, home telephone number, work address, work telephone number, e-mail address, or the like. The make/model of automobile field 204 may contain a description of the automobile being leased by the lessee, such as a make, model, vehicle identification number and the like. The lease expiration date field may contain an indication of the date on which the lessee's lease is set to expire. The dealer field 207 may contain an identification and contact information for an a dealer or retailer maintaining the rights to the automobile under the lease. The confirmation of purchase/renewal field may provide an indication of whether the lessee has agreed to purchase or re-lease the automobile, and any pertinent information relating thereto. The confirmation of insurance provided field 210 may contain an indication of whether a provision of insurance under the incentive program has been provided to the particular lessee.

Referring now to FIG. 3, therein is depicted a process 300 for identifying an expiring lease and offering a provision of insurance in exchange for an agreement to purchase or re-lease an automobile after an expiration of a lease. The process 300 begins at step 302 wherein a party, such as a retailer of a financial agent identifies a lease with an approaching expiration date. The party then notifies the lessee of an incentive to purchase or re-lease the vehicle (step 304). The incentive includes the provision of an insurance policy to the lessee at a no cost or a reduced cost at the time the lessee agrees to purchase or re-lease the vehicle. Such notification may take place via telephone, in-person solicitation, mail solicitation, or by transmitting a message to lessee terminal 102 over the computer network 100, using the appropriate information stored in field 203 of database 200. Further incentives may be provided, such as the provision of an extended warranty, a rebate on a purchase or lowered interest rates on financing or re-lease.

The lessee may then agree to purchase or re-lease the vehicle (step 306). A confirmation of the lessee's agreement may then be stored, for example, in field 208 of lessee database 200.

An insurance provider may then be notified of the lessee's agreement and provide insurance according to the incentive program (step 308). Confirmation of the provision of the insurance may then be stored in field 210 of database 200, after which process 300 ends. In preferred embodiments, the insurance premium for the insurance provided to the lessee may be provided to the insurance provider by any party other than the lessee, such as the retailer, the financing agent or the manufacturer of the automobile.

In certain embodiments of the present invention, it is contemplated that the term of insurance provided may coincide with the term of a re-lease of the automobile.

It is also contemplated that the term of insurance provided may be based on a calculation of the cost of the insurance for the term in comparison to the differential between the residual value of the automobile at the end of the lease and the projected residual value listed at the time the lease was initiated. In such an embodiment, a term of insurance is provided such that the insurance premium is less than the differential between the actual and projected residual value, thereby allowing a financial agent or the like to recoup a portion of the lost value of the automobile. The lost value of the automobile may also be recovered through the price of the re-purchase or re-lease of the automobile.

It is further contemplated that insurance policy provided in accordance with the present invention may have terms of greater than one year, or multi-year terms. The term of the insurance policy may further be co-extensive with the term of any lease or loan secured by the lessee for the purchase or re-lease of the automobile.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A processor-implemented method for encouraging the purchase or re-leasing of an item after an expiration of a lease, comprising:
   identifying via a processor a lease on an item that corresponds to an electronically stored record, the lease having an approaching expiration date;
   identifying a customer corresponding to the lease; and
   offering the customer a paid insurance policy in exchange for purchasing or re-leasing the item after the expiration date.

2. The method of claim 1, wherein the insurance policy covers the item upon a completion of the purchase of the item by the customer.

3. The method of claim 1, further comprising:
   entering into a sales agreement with the customer.

4. The method of claim 1, further comprising:
   paying a premium to an insurance provider for the insurance for the item.

5. The method of claim 1, wherein the insurance policy has a maximum term of one year.

6. The method of claim 1, wherein the item is an automobile of a particular make and a model.

7. The method of claim 1, wherein the insurance policy covers comprehensive losses relating to the item.

8. The method of claim 1, wherein the insurance policy covers collision losses relating to the item.

9. The method of claim 1, wherein the insurance policy is provided without consideration of further characteristics of the buyer by an insurance provider.

10. The method of claim 1, wherein the insurance policy covers all users of the item.

11. The method of claim 1, wherein said offering further comprises paying at least a portion of the insurance premium for the insurance policy.

12. The method of claim 11, wherein said paying further comprises:
    paying the insurance premium to an affiliate for the insurance policy.

13. The method of claim 1, wherein the insurance premium is the same for each of a class of items to which the item belongs.

14. The method of claim 1, wherein the customer must reside in a selected geographic region to receive the insurance.

15. The method of claim 1, wherein the insurance is provided based on a class of the item and a geographic region in which the customer resides, without consideration of further characteristics of the buyer by an insurance provider.

16. A processor-implemented method for encouraging the purchase or re-leasing of an item after an expiration of a lease, comprising:
    identifying via a processor a customer record electronically stored having a lease on an item, the lease having an approaching expiration date;
    calculating a difference between an actual residual value and a projected residual value of the item; and
    determining a term for an insurance policy, the insurance policy having an insurance premium at most equal to the difference; and
    if the customer purchases or re-leases the item at the expiration of the lease, paying the insurance premium on behalf of the customer for the term of the insurance policy.

17. The method of claim 16, wherein the insurance policy covers the item upon a completion of the purchase of the item by the customer.

18. The method of claim 16, further comprising:
    entering into a sales agreement with the customer.

19. The method of claim 16, further comprising:
    paying a premium to an insurance provider for the insurance for the item.

20. The method of claim 16, wherein the insurance policy has a maximum term of one year.

21. The method of claim 16, wherein the item is an automobile of a particular make and a model.

22. The method of claim 16, wherein the insurance policy covers comprehensive losses relating to the item.

23. The method of claim 16, wherein the insurance policy covers collision losses relating to the item.

24. The method of claim 16, wherein the insurance policy is provided without consideration of further characteristics of the buyer by an insurance provider.

25. The method of claim 16, wherein the insurance policy covers all users of the item.

26. The method of claim 16, wherein said offering further comprises paying at least a portion of the insurance premium for the insurance policy.

27. The method of claim 26, wherein said paying further comprises:
paying the insurance premium to an affiliate for the insurance policy.

28. The method of claim 16, wherein the insurance premium is the same for each of a class of items to which the item belongs.

29. The method of claim 16, wherein the customer must reside in a selected geographic region to receive the insurance.

30. The method of claim 16, wherein the insurance is provided based on a class of the item and a geographic region in which the customer resides, without consideration of further characteristics of the buyer by an insurance provider.

31. An apparatus for encouraging a purchase of an item after an expiration of a lease for the item, comprising:
means for identifying a lease on an item, the lease having an approaching expiration date;
means for identifying a customer corresponding to the lease; and
means for offering the customer an insurance policy for the item in exchange for purchasing the item after the expiration date.

32. An apparatus for encouraging a purchase of an item after an expiration of a lease for the item, comprising:
a processor; and
a memory in communication with the processor, the memory for storing a plurality of processing instructions enabling the processor to:
identify a lease on an item, the lease having an approaching expiration date;
identify a customer corresponding to the lease; and
provide an offer to the customer for an insurance policy for the item in exchange for purchasing the item after the expiration date.

33. A computer-readable medium encoded with processing instructions for implementing a method, performed by a computer, for encouraging a purchase of an item after an expiration of a lease for the item, the method comprising:
identifying a lease on an item, the lease having an approaching expiration date;
identifying a customer corresponding to the lease; and
offering the customer an insurance policy for the item in exchange for purchasing the item after the expiration date.

34. An apparatus for encouraging the purchase of an item after an expiration of a lease for the item, comprising:
means for identifying a customer having a lease on an item, the lease having an approaching expiration date;
means for calculating a difference between an actual residual value and a projected residual value of the item;
means for determining a term for an insurance policy, the insurance policy having an insurance premium at most equal to the difference; and
means for paying at least a portion of the insurance premium on behalf of the customer for the term of the insurance policy, if the customer purchases the item at the expiration of the lease.

35. An apparatus for encouraging the purchase of an item after an expiration of a lease for the item, comprising:
a processor; and
a memory in communication with the processor, the memory for storing a plurality of processing instructions enabling the processor to:
identify a customer having a lease on an item, the lease having an approaching expiration date;
calculate a difference between an actual residual value and a projected residual value of the item;
determine a term for an insurance policy, the insurance policy having an insurance premium at most equal to the difference; and
pay at least a portion of the insurance premium on behalf of the customer for the term of the insurance policy, if the customer purchases the item at the expiration of the lease.

36. A computer-readable medium encoded with processing instructions for implementing a method, performed by a computer, for encouraging the purchase of an item after an expiration of a lease for the item, the method comprising:
identifying a customer having a lease on an item, the lease having an approaching expiration date;
calculating a difference between an actual residual value and a projected residual value of the item;
determining a term for an insurance policy, the insurance policy having an insurance premium at most equal to the difference; and
if the customer purchases the item at the expiration of the lease, paying at least a portion the insurance premium on behalf of the customer for the term of the insurance policy.

37. A processor-implemented method for encouraging a customer to enter into a new lease of an item after an expiration of a lease for the item, comprising:
identifying via a processor a customer having a lease on an item, the lease having an approaching expiration date;
calculating a difference between an actual residual value and a projected residual value of the item;
determining a term for an insurance policy, the insurance policy having an insurance premium at most equal to the difference; and
if the customer enters into a new lease for the item at the expiration of the lease, paying at least a portion of the insurance premium on behalf of the customer for the term of the insurance policy.

38. The method of claim 37, wherein the insurance policy covers the item upon a completion of the new lease of the item by the customer.

39. The method of claim 37, further comprising: entering into a new lease agreement with the customer.

40. The method of claim 37, further comprising:
paying a premium to an insurance provider for the insurance for the item.

41. The method of claim 37, wherein the insurance policy has a maximum term of one year.

42. The method of claim 37, wherein the item is an automobile of a particular make and a model.

43. The method of claim 37, wherein the insurance policy covers comprehensive losses relating to the item.

44. The method of claim 37, wherein the insurance policy covers collision losses relating to the item.

45. The method of claim 37, wherein the insurance policy is provided without consideration of further characteristics of the buyer by an insurance provider.

46. The method of claim 37, wherein the insurance policy covers all users of the item.

47. The method of claim 37, wherein said offering further comprises offering to pay at least a portion of the insurance premium for the insurance policy.

48. The method of claim 47, wherein said offering to pay further comprises:
paying the insurance premium to an affiliate for the insurance policy.

49. The method of claim 37, wherein the insurance premium is the same for each of the class of items to which the item belongs.

50. The method of claim 37, wherein the customer must reside in a selected geographic region to receive the insurance.

51. The method of claim 37, wherein the insurance is provided based on a class of the item and a geographic region in which the customer resides, without consideration of further characteristics of the buyer by an insurance provider.

52. An apparatus for encouraging a customer to enter into a new lease of an item after an expiration of a lease for the item, comprising:
   means for identifying a customer having a lease on an item, the lease having an approaching expiration date;
   means for calculating a difference between an actual residual value and a projected residual value of the item;
   means for determining a term for an insurance policy, the insurance policy having an insurance premium at most equal to the difference; and
   means for paying at least a portion of the insurance premium on behalf of the customer for the term of the insurance policy, if the customer enters into a new lease for the item at the expiration of the lease.

53. An apparatus for encouraging a customer to enter into a new lease of an item after an expiration of a lease for the item, comprising:
   a processor; and
   a memory in communication with the processor, the memory for storing a plurality of processing instructions enabling the processor to:
      identify a customer having a lease on an item, the lease having an approaching expiration date;
      calculate a difference between an actual residual value and a projected residual value of the item;
      determine a term for an insurance policy, the insurance policy having an insurance premium at most equal to the difference; and
      pay at least a portion of the insurance premium on behalf of the customer for the term of the insurance policy, if the customer enters into a new lease for the item at the expiration of the lease.

54. A computer-readable medium encoded with processing instructions for implementing a method, performed by a computer, for encouraging a customer to enter into a new lease of an item after an expiration of a lease for the item, the method comprising:
   identifying a customer having a lease on an item, the lease having an approaching expiration date;
   calculating a difference between an actual residual value and a projected residual value of the item;
   determining a term for an insurance policy, the insurance policy having an insurance premium at most equal to the difference; and
   if the customer enters into a new lease for the item at the expiration of the lease, paying at least a portion of the insurance premium on behalf of the customer for the term of the insurance policy.

55. A method operable on a computer for providing an incentive incident to the purchase or re-lease of an automobile, comprising the steps of:
   identifying via a processor a plurality of automobile models for which it is desired to provide an incentive to encourage the sale or re-lease of said plurality of automobile models;
   identifying a plurality of leased automobiles, each of said leased automobiles comprising one of said plurality of automobile models, each of said plurality of leased automobiles owned by a respective lessee, each of said plurality of leased automobiles scheduled to come off lease on an approaching expiration date;
   initiating to the lessee of each of said plurality of leased automobiles an offer to pay at least a portion of an insurance premium for an automobile insurance policy covering said current lessee for the currently leased automobile if the lessee purchases or releases the currently leased automobile upon the expiration date;
   paying, upon the purchase or re-lease of at least one of said plurality of leased automobiles by a current lessee, at least a portion of the cost of the automobile insurance policy covering said current lessee for the purchased or re-leased automobile; and
   initiating the issuance of said automobile insurance policy covering said current lessee covering said current lessee for the purchased or re-leased automobile.

56. A method in accordance with claim 55, wherein said insurance policy is for a fixed term of time.

57. A method in accordance with claim 55, wherein said offer to pay at least a portion of an insurance premium includes an offer to pay the entirety of said insurance premium; and
   said step of paying at least apportion of the cost of the automobile insurance policy includes paying for the entire policy.

58. A method in accordance with claim 55, wherein each of said plurality of leased automobiles has associated with it an estimated residual value estimated at the initiation of the lease and an actual residual value determined at the expiration of the lease; and
   the cost of said automobile insurance policy is selected to be less than the difference between said estimated and said actual residual values.

59. A method in accordance with claim 55, wherein said step of initiating to the lessee of each of said plurality of leased automobiles an offer includes an offer to provide a further incentive upon the purchase or re-lease of the currently leased automobile.

60. A method in accordance with claim 59, wherein said additional incentive is selected from the group comprising an extended warranty, a rebate on a purchase and a lowered interest rate on financing or re-lease.

61. A method in accordance with claim 55, further including:
   identifying at least one selected geographic region wherein it is desired to provide said incentive, wherein said step of identifying a plurality of leased automobiles further including each of said plurality of leased automobiles in said selected geographic region.

62. A processor-implemented method for providing an incentive incident to the purchase or re-lease of an automobile, comprising:
   identifying via a processor a plurality of automobile models for which it is desired to provide an incentive to encourage the sale or re-lease of said plurality of automobile models;
   identifying a plurality of leased automobiles, each of said leased automobiles comprising one of said plurality of automobile models, each of said plurality of leased automobiles owned by a respective lessee, each of said plurality of leased automobiles scheduled to come off lease on an approaching expiration date;
   initiating to the lessee of each of said plurality of leased automobiles an offer to pay at least a portion of an insurance premium for an automobile insurance policy covering said current lessee for the currently leased automobile if the lessee purchases or releases the currently leased automobile upon the expiration date;

paying, upon the purchase or re-lease of at least one of said plurality of leased automobiles by a current lessee, at least a portion of the cost of the automobile insurance policy covering said current lessee for the purchased or re-leased automobile; and initiating the issuance of said automobile insurance policy covering said current lessee covering said current lessee for the purchased or re-leased automobile.

63. An apparatus operable on a computer for providing an incentive incident to the purchase or re-lease of an automobile, comprising:

means for identifying a plurality of automobile models for which it is desired to provide an incentive to encourage the sale or re-lease of said plurality of automobile models;

means for identifying a plurality of leased automobiles, each of said leased automobiles comprising one of said plurality of automobile models, each of said plurality of leased automobiles owned by a respective lessee, each of said plurality of leased automobiles scheduled to come off lease on an approaching expiration date;

means for initiating to the lessee of each of said plurality of leased automobiles an offer to pay at least a portion of an insurance premium for an automobile insurance policy covering said current lessee for the currently leased automobile if the lessee purchases or re-leases the currently leased automobile upon the expiration date;

means for paying, upon the purchase or re-lease of at least one of said plurality of leased automobiles by a current lessee, at least a portion of the cost of the automobile insurance policy covering said current lessee for the purchased or re-leased automobile; and means for initiating the issuance of said automobile insurance policy covering said current lessee covering said current lessee for the purchased or re-leased automobile.

64. A computer-readable medium encoded with processing instructions for implementing a method operable on a computer for providing an incentive incident to the purchase or re-lease of an automobile, the method comprising:

identifying a plurality of automobile models for which it is desired to provide an incentive to encourage the sale or re-lease of said plurality of automobile models;

identifying a plurality of leased automobiles, each of said leased automobiles comprising one of said plurality of automobile models, each of said plurality of leased automobiles owned by a respective lessee, each of said plurality of leased automobiles scheduled to come off lease on an approaching expiration date;

initiating to the lessee of each of said plurality of leased automobiles an offer to pay at least a portion of an insurance premium for an automobile insurance policy covering said current lessee for the currently leased automobile if the lessee purchases or releases the currently leased automobile upon the expiration date;

paying, upon the purchase or re-lease of at least one of said plurality of leased automobiles by a current lessee, at least a portion of the cost of the automobile insurance policy covering said current lessee for the purchased or re-leased automobile; and initiating the issuance of said automobile insurance policy covering said current lessee covering said current lessee for the purchased or re-leased automobile.

65. An apparatus for providing an incentive incident to the purchase or re-lease of an automobile, comprising:

a processor; and a memory in communication with the processor, the memory for storing a plurality of processing instructions directing the processor to:

identify a plurality of automobile models for which it is desired to provide an incentive to encourage the sale or re-lease of said plurality of automobile models;

identify a plurality of leased automobiles, each of said leased automobiles comprising one of said plurality of automobile models, each of said plurality of leased automobiles owned by a respective lessee, each of said plurality of leased automobiles scheduled to come off lease on an approaching expiration date;

initiate to the lessee of each of said plurality of leased automobiles an offer to pay at least a portion of an insurance premium for an automobile insurance policy covering said current lessee for the currently leased automobile if the lessee purchases or releases the currently leased automobile upon the expiration date;

pay, upon the purchase or re-lease of at least one of said plurality of leased automobiles by a current lessee, at least a portion of the cost of the automobile insurance policy covering said current lessee for the purchased or re-leased automobile; and initiate the issuance of said automobile insurance policy covering said current lessee covering said current lessee for the purchased or re-leased automobile.

66. A method operable on a computer for providing an incentive incident to the purchase or re-lease of an automobile, comprising the steps of:

identifying via a processor a plurality of automobile models for which it is desired to provide an incentive to encourage the sale or re-lease of said plurality of automobile models;

identifying at least one selected geographic region wherein it is desired to provide said incentive;

identifying a plurality of leased automobiles, each of said leased automobiles comprising one of said plurality of automobile models, each of said plurality of leased automobiles owned by a respective lessee in said at least one selected geographic region, each of said plurality of leased automobiles scheduled to come off lease on an approaching expiration date;

calculating for each of said plurality of leased automobiles a difference value comprising the difference between a projected residual value at the initiation of the lease and an actual residual value at the expiration date of the lease;

selecting for each of said plurality of leased automobiles an insurance policy covering the current lessee for the currently leased automobile having a premium less than said difference value;

initiating to the lessee of each of said plurality of leased automobiles an offer to pay at least a portion of the insurance premium for the selected insurance policy if the lessee purchases or re-leases the currently leased automobile upon the expiration date;

paying, upon the purchase or re-lease of at least one of said plurality of leased automobiles by a current lessee, at least a portion of the cost of the automobile insurance policy covering said current lessee for the purchased or re-leased automobile; and initiating the issuance of said automobile insurance policy covering said current lessee covering said current lessee for the purchased or re-leased automobile.

67. A method in accordance with claim 66, wherein said insurance policy is for a fixed term of time.

68. A method in accordance with claim 66, wherein said offer to pay at least a portion of an insurance premium includes an offer to pay the entirety of said insurance premium; and said paying at least a portion of the cost of the automobile insurance policy includes paying for the entire policy.

69. A method in accordance with claim 66, wherein said initiating to the lessee of each of said plurality of leased automobiles an offer includes an offer to provide a further incentive upon the purchase or re-lease of the currently leased automobile.

70. A method in accordance with claim 69, wherein said additional incentive is selected from a group comprising: an extended warranty, a rebate on a purchase and a lowered interest rate on financing or re-lease.

71. A processor-implemented method for providing an incentive incident to the purchase or re-lease of an automobile, comprising the steps of:

identifying via a processor a plurality of automobile models for which it is desired to provide an incentive to encourage the sale or re-lease of said plurality of automobile models;

identifying at least one selected geographic region wherein it is desired to provide said incentive;

identifying a plurality of leased automobiles, each of said leased automobiles comprising one of said plurality of automobile models, each of said plurality of leased automobiles owned by a respective lessee in said at least one selected geographic region, each of said plurality of leased automobiles scheduled to come off lease on an approaching expiration date;

calculating for each of said plurality of leased automobiles a difference value comprising the difference between a projected residual value at the initiation of the lease and an actual residual value at the expiration date of the lease;

selecting for each of said plurality of leased automobiles an insurance policy covering the current lessee for the currently leased automobile having a premium less than said difference value;

initiating to the lessee of each of said plurality of leased automobiles an offer to pay at least a portion of the insurance premium for the selected insurance policy if the lessee purchases or re-leases the currently leased automobile upon the expiration date;

paying, upon the purchase or re-lease of at least one of said plurality of leased automobiles by a current lessee, at least a portion of the cost of the automobile insurance policy covering said current lessee for the purchased or re-leased automobile; and initiating the issuance of said automobile insurance policy covering said current lessee covering said current lessee for the purchased or re-leased automobile.

72. A computer-readable medium encoded with processing instructions for implementing a method operable on a computer for providing an incentive incident to the purchase or re-lease of an automobile, the method comprising:

identifying a plurality of automobile models for which it is desired to provide an incentive to encourage the sale or re-lease of said plurality of automobile models;

identifying at least one selected geographic region wherein it is desired to provide said incentive;

identifying a plurality of leased automobiles, each of said leased automobiles comprising one of said plurality of automobile models, each of said plurality of leased automobiles owned by a respective lessee in said at least one selected geographic region, each of said plurality of leased automobiles scheduled to come off lease on an approaching expiration date;

calculating for each of said plurality of leased automobiles a difference value comprising the difference between a projected residual value at the initiation of the lease and an actual residual value at the expiration date of the lease;

selecting for each of said plurality of leased automobiles an insurance policy covering the current lessee for the currently leased automobile having a premium less than said difference value;

initiating to the lessee of each of said plurality of leased automobiles an offer to pay at least a portion of the insurance premium for the selected insurance policy if the lessee purchases or re-leases the currently leased automobile upon the expiration date;

paying, upon the purchase or re-lease of at least one of said plurality of leased automobiles by a current lessee, at least a portion of the cost of the automobile insurance policy covering said current lessee for the purchased or re-leased automobile; and initiating the issuance of said automobile insurance policy covering said current lessee covering said current lessee for the purchased or re-leased automobile.

73. An apparatus for providing an incentive incident to the purchase or re-lease of an automobile, comprising:

means for identifying a plurality of automobile models for which it is desired to provide an incentive to encourage the sale or re-lease of said plurality of automobile models;

means for identifying at least one selected geographic region wherein it is desired to provide said incentive;

means for identifying a plurality of leased automobiles, each of said leased automobiles comprising one of said plurality of automobile models, each of said plurality of leased automobiles owned by a respective lessee in said at least one selected geographic region, each of said plurality of leased automobiles scheduled to come off lease on an approaching expiration date;

means for calculating for each of said plurality of leased automobiles a difference value comprising the difference between a projected residual value at the initiation of the lease and an actual residual value at the expiration date of the lease;

means for selecting for each of said plurality of leased automobiles an insurance policy covering the current lessee for the currently leased automobile having a premium less than said difference value;

means for initiating to the lessee of each of said plurality of leased automobiles an offer to pay at least a portion of the insurance premium for the selected insurance policy if the lessee purchases or re-leases the currently leased automobile upon the expiration date;

means for paying, upon the purchase or re-lease of at least one of said plurality of leased automobiles by a current lessee, at least a portion of the cost of the automobile insurance policy covering said current lessee for the purchased or re-leased automobile; and means for initiating the issuance of said automobile insurance policy covering said current lessee covering said current lessee for the purchased or re-leased automobile.

74. An apparatus for providing an incentive incident to the purchase or release of an automobile, comprising:

a processor; and a memory in communication with the processor, the memory for storing a plurality of processing instructions for directing the processor to:
- identify a plurality of automobile models for which it is desired to provide an incentive to encourage the sale or re-lease of said plurality of automobile models;
- identify at least one selected geographic region wherein it is desired to provide said incentive;
- identify a plurality of leased automobiles, each of said leased automobiles comprising one of said plurality of automobile models, each of said plurality of leased automobiles owned by a respective lessee in said at least one selected geographic region, each of said plurality of leased automobiles scheduled to come off lease on an approaching expiration date;
- calculate for each of said plurality of leased automobiles a difference value comprising the difference between a projected residual value at the initiation of the lease and an actual residual value at the expiration date of the lease;
- select for each of said plurality of leased automobiles an insurance policy covering the current lessee for the currently leased automobile having a premium less than said difference value;
- initiate to the lessee of each of said plurality of leased automobiles an offer to pay at least a portion of the insurance premium for the selected insurance policy if the lessee purchases or re-leases the currently leased automobile upon the expiration date;
- pay, upon the purchase or re-lease of at least one of said plurality of leased automobiles by a current lessee, at least a portion of the cost of the automobile insurance policy covering said current lessee for the purchased or re-leased automobile; and
- initiate the issuance of said automobile insurance policy covering said current lessee covering said current lessee for the purchased or re-leased automobile.

75. A processor-implemented method for promoting sales a leased automobile, comprising the steps of:
- identifying via a processor one or more automobile models that qualify for an incentive package;
- identifying a qualifying geographic region for associated with the incentive package;
- identifying a pool of potential qualifying leases from a lease database, wherein each potential qualifying lease has expiration date that falls within a system determined qualification window; and
- creating a listing of qualifying leases that satisfy the model and geographic requirements associated with the incentive package;
- calculating for each qualifying lease a difference value comprising the difference between a projected residual value of the automobile at the initiation of the lease and an actual residual value at the expiration date of the lease;
- filtering the listing of qualifying leases based on a lease for an automobile that has premium that is less than said difference value; and
- initiating to the lessee of each of said plurality of leased automobiles an offer to pay at least a portion of the insurance premium for the selected insurance policy if the lessee purchases or re-leases the currently leased automobile upon the expiration date;
- paying, upon the purchase or re-lease of at least one of said plurality of leased automobiles by a current lessee, at least a portion of the cost of the automobile insurance policy covering said current lessee for the purchased or re-leased automobile; and
- initiating the issuance of said automobile insurance policy covering said current lessee covering said current lessee for the purchased or re-leased automobile.

76. The method of claim 75, wherein the qualification window is based on an expiration date no more that 6 months from the date of the identifying leases used to populate the pool of potential qualifying leases occurs.

77. A processor-implemented method for encouraging the purchase or re-leasing of an item after an expiration of a lease, comprising:
- identifying via a processor a lease on an item that corresponds to an electronically stored record, the lease having an approaching expiration date;
- identifying a customer corresponding to the lease;
- offering the customer a paid insurance policy in exchange for purchasing or re-leasing the item after the expiration date,
- wherein the insurance policy covers the item upon a completion of the purchase of the item by the customer; and
- paying a premium to an insurance provider for the insurance for the item.

78. The method of claim 77, wherein the insurance policy has a maximum term of one year.

* * * * *